US012495858B1

(12) United States Patent
Guadalajara

(10) Patent No.: US 12,495,858 B1
(45) Date of Patent: Dec. 16, 2025

(54) METHOD OF PRODUCING A CUSTOM ORTHOTIC INSOLE

(71) Applicant: Jason Guadalajara, Los Angeles, CA (US)

(72) Inventor: Jason Guadalajara, Los Angeles, CA (US)

( * ) Notice: Subject to any disclaimer, the term of this patent is extended or adjusted under 35 U.S.C. 154(b) by 315 days.

(21) Appl. No.: 18/141,219

(22) Filed: Apr. 28, 2023

Related U.S. Application Data

(63) Continuation-in-part of application No. 18/089,340, filed on Dec. 27, 2022, now Pat. No. 12,302,997.

(60) Provisional application No. 63/350,080, filed on Jun. 8, 2022, provisional application No. 63/338,847, filed on May 5, 2022.

(51) Int. Cl.

| | |
|---|---|
| ***B29D 35/14*** | (2010.01) |
| ***A43B 7/144*** | (2022.01) |
| ***A43B 7/28*** | (2006.01) |
| ***A43B 17/00*** | (2006.01) |
| ***A43B 17/14*** | (2006.01) |

(52) U.S. Cl.
CPC ................ *A43B 7/144* (2013.01); *A43B 7/28* (2013.01); *A43B 17/006* (2013.01); *A43B 17/14* (2013.01); *B29D 35/142* (2013.01)

(58) Field of Classification Search
CPC ................................ A43B 7/28; A43B 7/144
See application file for complete search history.

(56) References Cited

U.S. PATENT DOCUMENTS

2012/0131817 A1* 5/2012 Kaakkola ............... A43B 7/142
428/156

FOREIGN PATENT DOCUMENTS

WO WO-0189337 A1 * 11/2001 ............ A43B 17/02

* cited by examiner

*Primary Examiner* — John J DeRusso
(74) *Attorney, Agent, or Firm* — Richard Eldredge; Leavitt Eldredge Law Firm

(57) ABSTRACT

A method of producing a customized shoe insole includes creating a heel cup out of resin; encasing the heel cup in a moldable material; heating the heel cup encased in the moldable material; applying a desired pressure to the heel cup encased in the moldable material to form the heel cup to a desired shape while the moldable material prevents the resin from escaping; and allowing the heel cup encased in the moldable material to cool to create the customized shoe insole; wherein the heel cup is fully enclosed within the moldable material; wherein the resin releases gas when melted.

7 Claims, 5 Drawing Sheets

METHOD OF PRODUCING A CUSTOM ORTHOTIC INSOLE

CROSS REFERENCE TO RELATED APPLICATIONS

This application is a continuation-in-part of U.S. application Ser. No. 18/089,340, filed on Dec. 27, 2022, of which is hereby incorporated by reference in its entirety.

BACKGROUND

1. Field of the Invention

The present invention relates generally to shoe inserts, and more specifically to a method of producing a customized insole.

2. Description of Related Art

Shoe insoles are well known in the art and are effective means to improve the comfort or functionality of a shoe. For example, a user may add an insert to their shoes to provide improved arch support or other functions. Conventional insoles are limited in customization and accordingly are limited in users for which the console will fit comfortably.

Accordingly, although great strides have been made in the area of shoe insoles, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
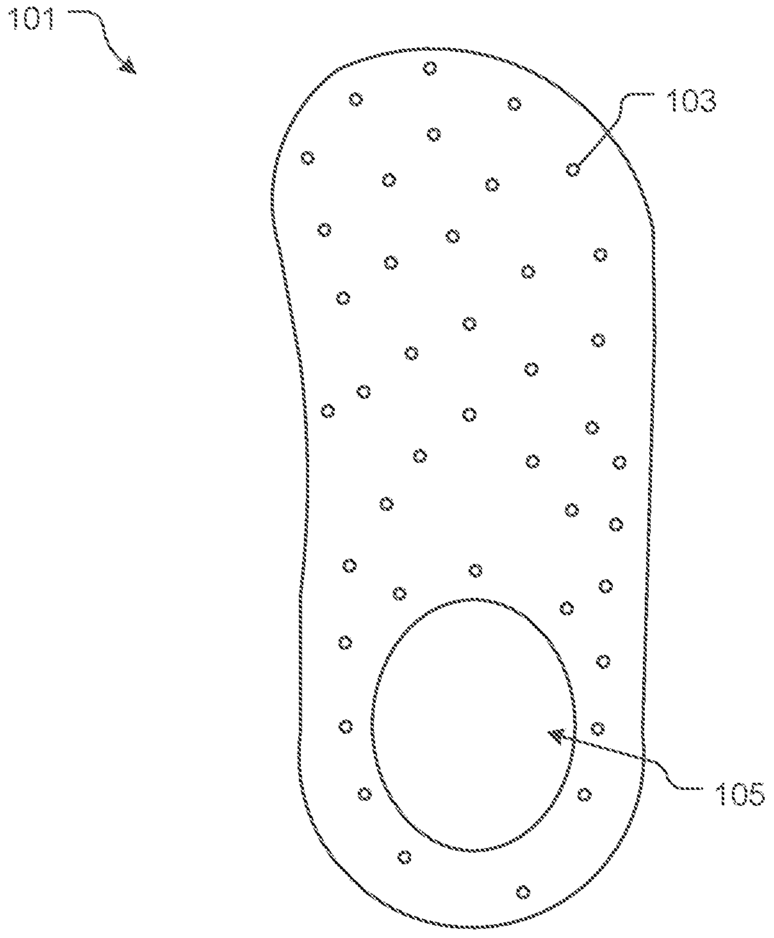
FIG. 1 is a front view of a heel cup in accordance with the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional insoles. Specifically, the present invention provides for a method of making a customizable insole, wherein a moldable material surrounds a thermoplastic heel cup such that the thermoplastic heel cup can be heated and molded within the moldable material to provide for a customized insole. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
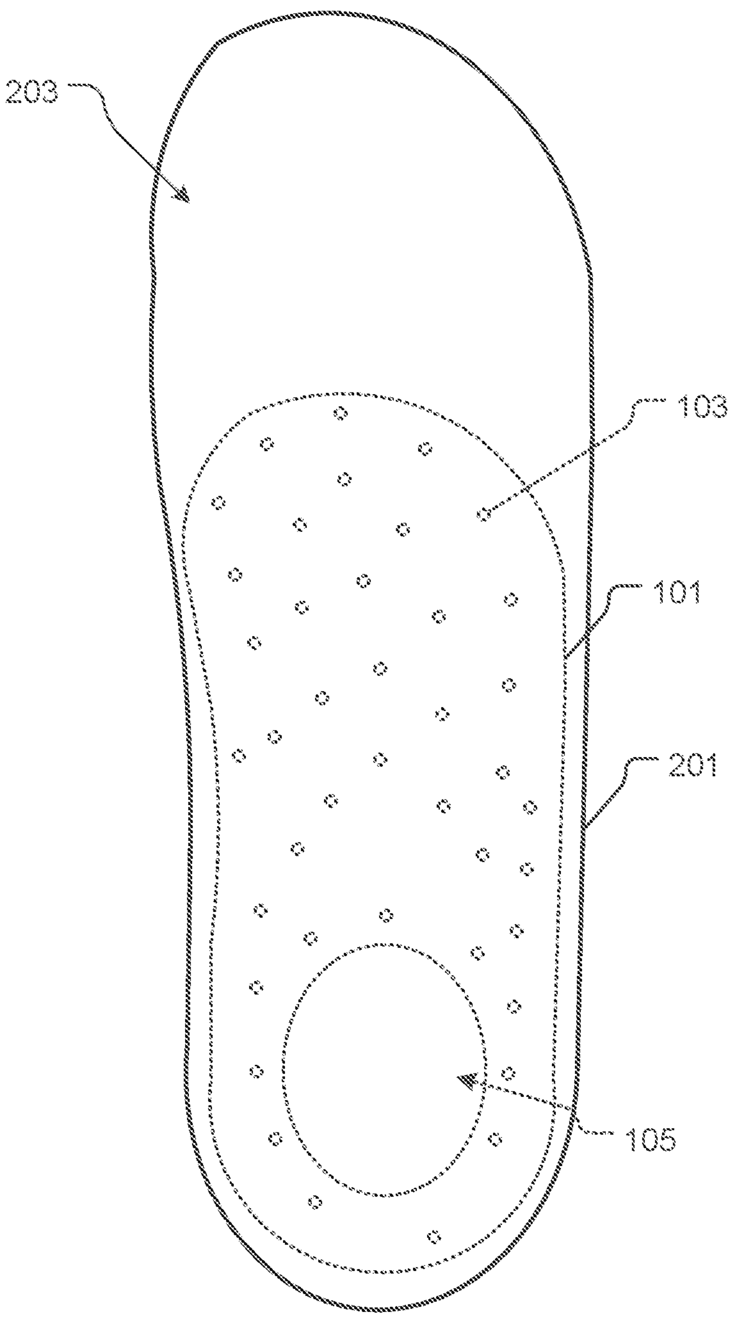
FIG. 2 is a front view of the heel cup within a moldable material in accordance with the present application.

Referring now to the drawings wherein like reference characters identify corresponding or similar elements throughout the several views, FIG. 1 depicts a front view of a heel cup 101 in accordance with a preferred embodiment of the present application. FIG. 2 depicts a front view of the heel cup 101 encased in a moldable material 201 to form the insole 203 in accordance with the present application.

In the contemplated embodiment, the heel cup 101 is formed from a thermoplastic material, wherein the thermoplastic material is configured such that when heated, it can be formed and retain a desired shape when cool. The heel cup 101 in some embodiments includes a plurality of holes 103 and can further include arch support 105 in some embodiments. The heel cup 101 can be formed through a plurality of methods, such as by injection molding, heat pressing or pouring the thermoplastic material into a mold. Pressure then being applied using a true thermoplastic such as a thermoplastic elastomer with a generally low melting point such as approximately 150 degrees F.-250 degrees F.

It is believed that thermoplastic elastomers may have the best properties for this operation. The heel cup 101 can be secured in a mold on pegs to hold it in place both in terms of location and height. A mold is configured with matching pegs to fit into the insert. The pegs may be thinner at the top and thicker at the bottom while the heel cup will have a corresponding hole. This allows the heel cup to rest at a certain determined elevation in the mold. The end of the pegs may include bulbs attached thereto to allow the thermoplastic insert to snap into place securely to avoid being pushed into other areas of the mold by the pressures of the curing process of polyurethane (PU) foam or gel. Due to the nature of injection molding, holes 103 can be placed in the heel cup to allow the uncured or unset moldable material to flow to all sides of the insert and fully cover the insert during the production process. Holes can be made by puncturing however the easiest method is to simply incorporate holes into the heel cup during the initial molding process by configuring the mold to make the holes. Using different sizes and proportions of holes as well as thickness of the 3*d* heel cup and arch support allows for control of the compression rate of the insole in that region. Placing less holes in the arch and wider holes on the exterior side creates dual compression rates in the insoles which allows for control in making some areas of the insole more supportive than others.

As shown in FIG. 2, after the heel cup is created, a moldable material 201 is used to surround the heel cup. This may be done through a variety of methods, and it should be appreciated that the moldable material may be a high-density PU foam or gel to fully form all around the heel cup thus creating a bag or chamber 203 and sealing the thermoplastic within thereby eliminating any need for an additional chamber to prevent the thermoplastic from leaking.

Polyurethane (PU) foam, gel or any other selected material is poured or injected into the mold so it will form around thermoplastic heel cup 101. This allows for the heel cup 101 to be altered for better performance if needed before production such as adding a foaming agent which creates air bubbles inside the heel cup for better molding potential or some viscoelastic or open cell foam combination to allow the heel cup to return to an original shape every time it is reheated.

If arch support is used, the arch support area may be configured with an additional PU foam pad to incorporate in a custom molding technology. This is applicant's prior technology of open cell foam impregnated with thermoplastic liquid that will mold to any shape and retain the shape until reheated again where it returns to its original shape when heated up again due to the foam's memory properties. When the insert melts, the thermoplastic will impregnate the foam by body pressure when the end user steps on the heated insole thus creating 3D moldable foam. The insole is then placed into an oven until the insert melts enough to fully be molded to a person's foot. As the thermoplastic material cools down and solidifies, the heel cup insert may now be in the exact shape of both the shoe and the user's foot, as the insole cools below its melting temperature, the thermoplastic solidifies, retaining the custom shape of the foot creating a custom stabilizing insole which keeps the foot alignment in place, and may help prevent rolled ankles and assist in the stabilization of the ankle during foot strikes while walking, running, or other activities.

Figure 3:
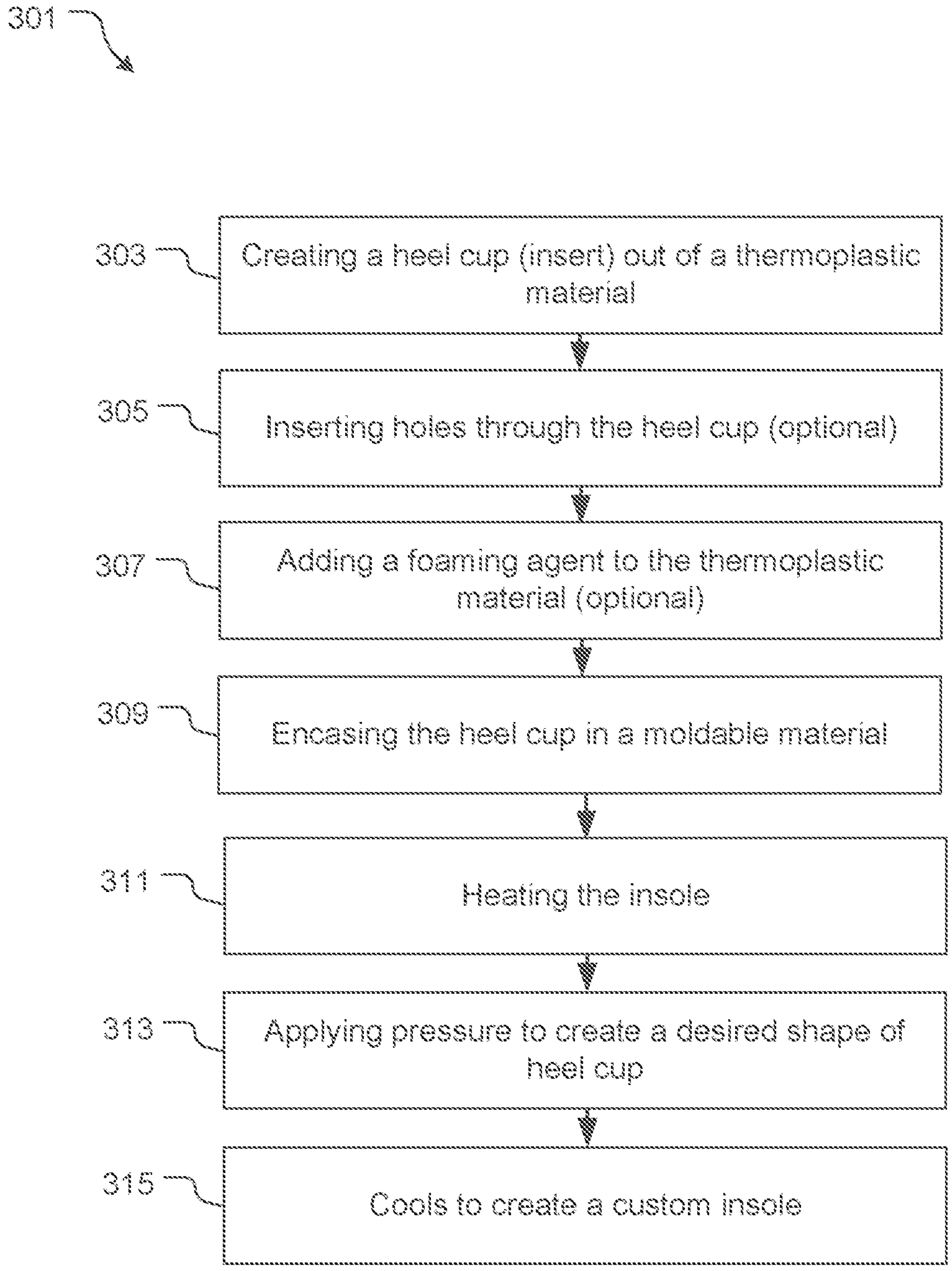
FIG. 3 is a flowchart of a method of creating a shoe insole in accordance with the present application.

In FIG. 3, a flowchart 301 depicts a method of making a customized insole in accordance with the present application. As shown, the heel cup is first created through a process such as injection molding, heat pressing, or pouring of material into a mold, as shown with box 303. In some embodiments, holes are inserted and/or a foaming agent is added as discussed above, as shown with boxes 305, 307. Next, encase the heel cup in a moldable material, such as gel or polyurethane foam, as shown with box 309. This forms the insole which can then be heated, as shown with box 311. While heated, a desired pressure is applied to the insole to create a shape, the moldable material prevents the thermoplastic material from escaping, as shown with box 313. The insole then cools, and the heel cup encased in the moldable material cools to create the customized shoe insole, as shown with box 315. The arch chamber is separate from the heel chamber/heel cup. It is under the arch of the foot.

It should be appreciated that the heel cup is fully enclosed within the moldable material; and the thermoplastic material is configured to lose a shape and liquify when heated.

Figure 4:
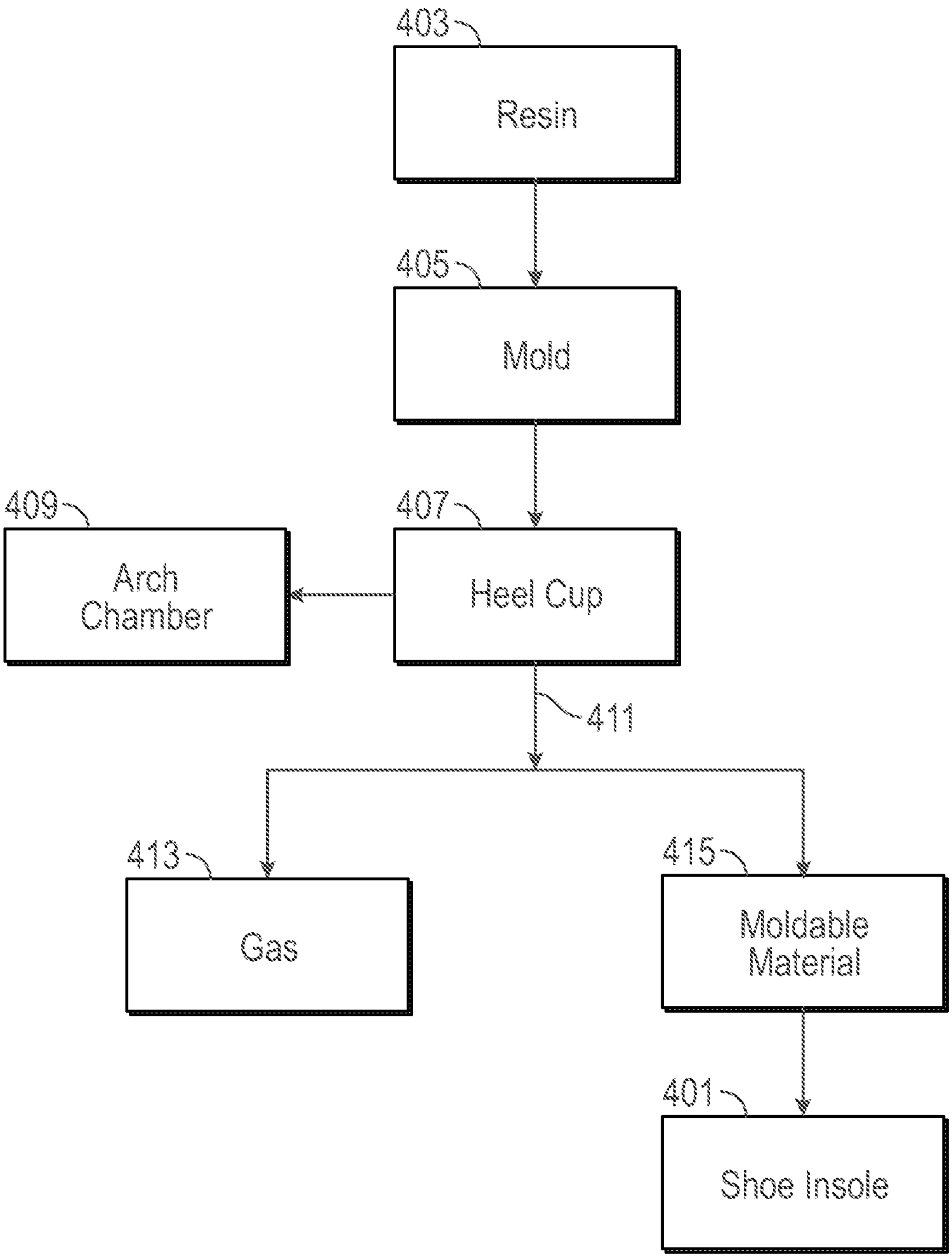
FIG. 4 is a schematic of a shoe insole formed with resin in accordance with the present application.

Referring now to FIG. 4, a schematic of a shoe insole 401 formed with resin 403 is depicted in accordance with the present application. The resin 403 is a thermoplastic material such that when heated, it can be formed and retain a desired shape when cool.

As shown, the resin 403 is injected, heat pressed, or poured into a mold 405 to create a heel cup 407 having an arch chamber 409. In some embodiments, the heel cup 407 can include holes and/or a foaming agent as discussed above. A heating technique 111 is applied, causing the resin 403 to melt. As the resin 403 melts, gas 413 is released from the resin 403, causing the arch chamber 409 to inflate. A moldable material 415 surrounds the heel cup 407 which yields the shoe insole 401. The shoe insole 401 then undergoes heat and pressure as discussed above to create the customized shoe insole.

It should be appreciated that the inflation of the arch chamber 409 assists with the remoldability of the shoe insole 401 by pushing the foaming agent back to its original shape as well as creating upwards pressure on the foot to prevent the shoe insole 401 from becoming substantially flat.

Figure 5:
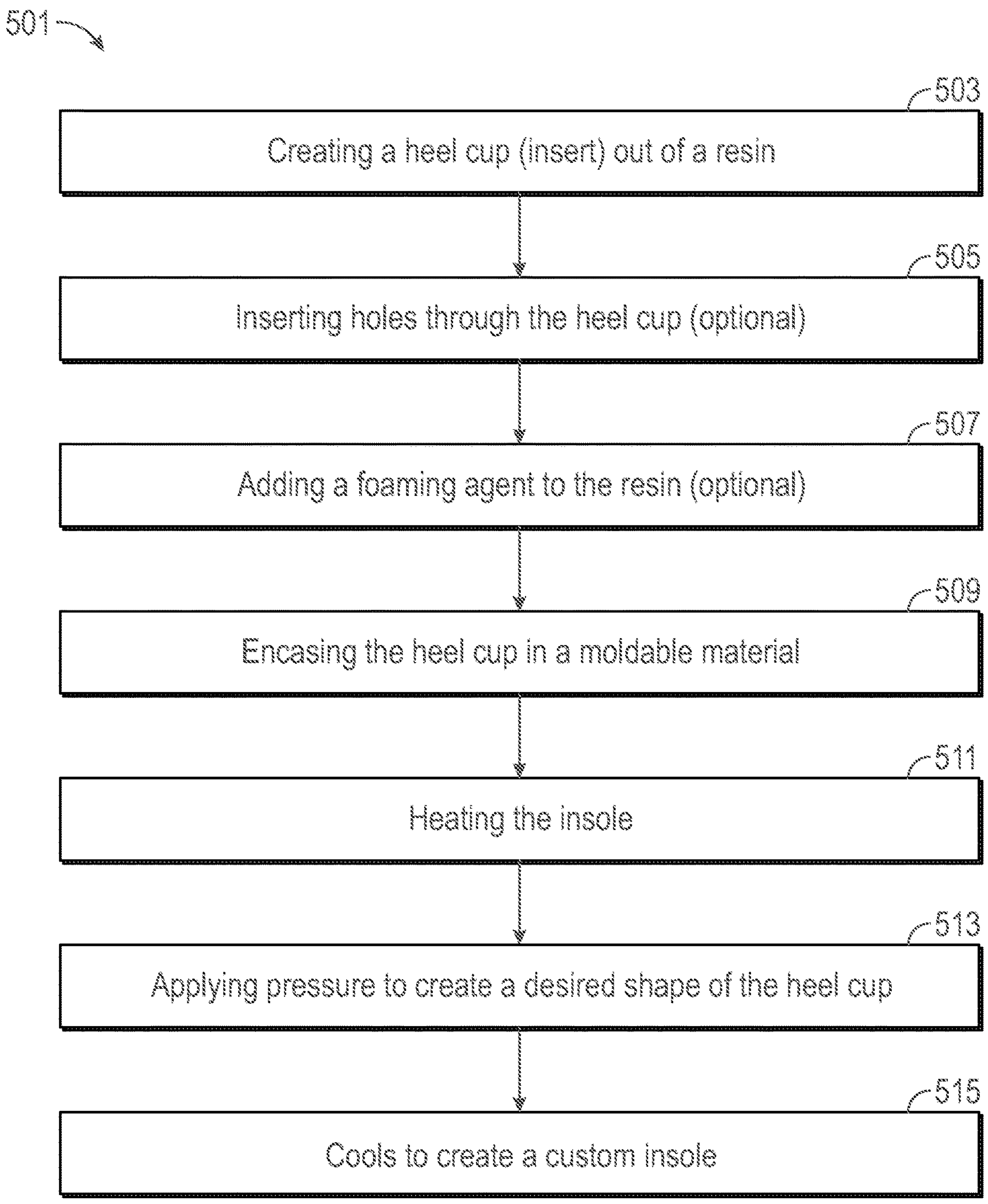
FIG. 5 is a flowchart of a method of creating a shoe insole with resin in accordance with the present application.

In FIG. 5, a flowchart 501 depicts a method of making a customized insole in accordance with the present application. As shown, a heel cup is first created through a process such as injection molding, heat pressing, or pouring of a resin into a mold, as shown with box 503. In some embodiments, holes are inserted and/or a foaming agent is added as discussed above, as shown with boxes 505, 507. Next, encasing the heel cup in a moldable material, such as gel or polyurethane foam, as shown with box 509. This forms the insole which can then be heated, as shown with box 511. While heated, a desired pressure is applied to the insole to create a shape, the moldable material prevents the thermoplastic material from escaping, as shown with box 513. The insole then cools, and the heel cup encased in the moldable material cools to create the customized shoe insole, as shown with box 515.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of producing a customized shoe insole, comprising:

creating a heel cup out of a resin;

encasing the heel cup in a moldable material;

heating the heel cup encased in the moldable material;

applying a desired pressure to the heel cup encased in the moldable material to form the heel cup to a desired shape while the moldable material prevents the resin from escaping; and allowing the heel cup encased in the moldable material to cool to create the customized shoe insole;

wherein the heel cup is fully enclosed within the moldable material;

wherein the resin is configured to lose a shape and liquify when heated;

wherein the resin releases gas when heated, causing an arch chamber within the heel cup to inflate.

2. The method of claim 1, wherein the moldable material is selected from a group consisting of gel and polyurethane foam.

3. The method of claim 1, wherein the moldable material further comprises:

a plurality of pegs configured to fit into the heel cup;

wherein the heel cup includes a corresponding hole for each peg of the plurality of pegs.

4. The method of claim 3, wherein each peg of the plurality of pegs further comprises:

a bulb attached thereto;

wherein the bulb allows the heel cup to securely stay in place, thereby preventing the heel cup from shifting within the moldable material when the moldable material encases around the heel cup.

5. The method of claim 1, wherein creating the heel cup is done through one of injection molding, heat pressing, or pouring of resin into a mold.

6. The method of claim 1, further comprising:

Inserting holes through the heel cup.

7. The method of claim 1, further comprising:

adding a foaming agent to the resin before creating the heel cup.

* * * * *